United States Patent
Porikli et al.

(10) Patent No.: US 9,076,227 B2
(45) Date of Patent: Jul. 7, 2015

(54) 3D OBJECT TRACKING IN MULTIPLE 2D SEQUENCES

(71) Applicants: Fatih Porikli, Watertown, MA (US); Feng Li, Malden, MA (US)

(72) Inventors: Fatih Porikli, Watertown, MA (US); Feng Li, Malden, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 404 days.

(21) Appl. No.: 13/632,500

(22) Filed: Oct. 1, 2012

(65) Prior Publication Data

US 2014/0093160 A1     Apr. 3, 2014

(51) Int. Cl.
*G06K 9/00*     (2006.01)
*G06T 7/20*     (2006.01)

(52) U.S. Cl.
CPC ....... *G06T 7/208* (2013.01); *G06T 2207/10076* (2013.01); *G06T 2207/10124* (2013.01); *G06T 2207/10136* (2013.01); *G06T 2207/20076* (2013.01); *G06T 2207/20081* (2013.01); *G06T 2207/30096* (2013.01)

(58) Field of Classification Search
USPC .......................................... 382/154, 103, 128
See application file for complete search history.

(56) References Cited

U.S. PATENT DOCUMENTS 7,778,446 B2 * 8/2010 Yang et al. .................... 382/103
2008/0300502 A1 * 12/2008 Yang et al. .................... 600/534
2009/0087023 A1 * 4/2009 Porikli et al. ................. 382/103
2009/0185078 A1 * 7/2009 Van Beek et al. ............. 348/624
2013/0064472 A1 * 3/2013 Zhang et al. .................. 382/294

OTHER PUBLICATIONS

Mei et al., "Robust visual tracking using L1 minimization." 2th Inter-national Conference on Computer Vision, IEEE, 1436-1443, 2009.
Tong, Lin et al: "Fluoroscopic Tumor Tracking for Image-guided Lung Cancer Radiotherapy," Physics in Medicine and Biology, Institute of Physics Publishing, Bristol GB. vol. 54, No. 4. Feb. 21, 2009.
Ying Cui et al: "Multiple Template-based Fluoroscopic Tracking of Lung Tumor Mass without Implanted Fiducial Markers," Physics in Medicine and Biology, Institute of Physics Publishing, Bristol GB. vol. 52, No. 20. Oct. 21, 2001.
Mohamed Hussein et al: "CrossTrack: Robust 3D Tracking from Two Cross-sectional Views," Computer Vision and Pattern Recognition, 2011 IEEE Conference On. paged 1041-1048. Jun. 20, 2011.
Tuzel et al: "Learning on Lie Groups for Invariant Detection and Tracking," Computer Vision and Pattern Recognition, 2008. CVPR IEEE Conference On. pp. 1-8. Jun. 23, 2008.

* cited by examiner

*Primary Examiner* — Kathleen Y Dulaney
(74) *Attorney, Agent, or Firm* — Dirk Brinkman; Gene Vinokur

(57) ABSTRACT

A tumor is tracked in multiple sequences of images acquired concurrently from different viewpoints. Features are extracted in each set of current images using a window. A regression function, subject to motion constraints, is applied to the features to obtain 3D motion parameters, which are applied to the tumor as observed in the images to obtain a 3D location of the object. Then, the shape of the 3D object at the 3D location is projected onto each image to update the location of the window for the next set of images to be processed.

17 Claims, 3 Drawing Sheets

3D OBJECT TRACKING IN MULTIPLE 2D SEQUENCES

RELATED APPLICATION

This U.S. Non-Provisional patent application is related to U.S. patent application Ser. No. 13/039,906, "Tumor Tracking System and Method for Radiotherapy," filed by Porikli on Mar. 3, 2011, incorporated herein by reference. The related application tracks a tumor subject to a motion caused by respiration of the patient during radiotherapy using a regression function.

FIELD OF THE INVENTION

This invention relates generally to image-guided radiation therapy, and more particular to tracking tumors during treatment.

BACKGROUND OF THE INVENTION

Image-guided radiation therapy (IGRT) systems use tumor tracking. With accurate tracking, large margins, which are added to planning target volumes due to respiration, can be eliminated to minimize adverse effects of radiation on healthy tissue. In addition, continuous radiation can shorten the duration of treatment sessions by eliminating respiration gating, and active breathing control (ABC).

Conventional tumor tracking determines the tumor location from internal and external surrogates. For instance, multiple passive (metallic) or active (electromagnetic) fiducial markers can be implanted around tumor to continuously monitor the motion of the tumor using X-ray videos. It is also possible to use a correspondence model for external markers, e.g., chest and abdominal pointers that are visible with optical imaging system, see the related U.S. patent application Ser. No. 13/039,906. Internal fiducial markers to estimate the tumor location indirectly are also possible.

However, implanted fiducial markers have a number of disadvantages. The markers require invasive surgery, can damage healthy tissue, cause collapsed lungs, and can shift causing uncertainty in location. In practice, correlation between the external or internal markers and the tumor location can be violated due to the complexity of human breathing.

A markerless tumor tracking method obtains parametric representations of the motion patterns of multiple surrogate regions to estimate the tumor location. However, that method requires labeling of surrogate regions and ground truth tumor locations for a long period of time for model training.

Another method describes multiple template matching for orthogonal X-ray images, see Mei et al., "Robust visual tracking using L1 minimization," $2^{th}$ Inter-national Conference on Computer Vision, IEEE, 1436-1443, 2009. That method uses particle filters, sparse templates and a Bayesian state interference framework. For low-contrast tumor regions where the image quality is low, template matching can fail.

The related U.S. patent application Ser. No. 13/039,906 disclosed a method for locating a moving target object, such as a tumor during radiotherapy, by applying a regression to features selected from 3D motion signals acquired of a patient's skin by a single motion sensor, such as laser scanner or 3D computer tomography.

SUMMARY OF THE INVENTION

The embodiments of the invention provide a method for tracking objects, e.g., tumors in patients during radiotherapy. The method does not require fiducial markers, or active breathing control of patients. The method generates multiple random motion hypotheses, and determines corresponding feature vectors in orthogonal-axis image regions. The hypotheses can be jointly generated in 3D to train a single 3D regression model, or in 2D, through back-projection to train two 2D models separately. The hypotheses are within limits of motion constraints.

The regression model maps features to 3D tumor motions by minimizing geodesic distances. For a motion prior probability, a linear trajectory constraint is incorporated as a motion constraint: to regularize the estimation results. An optimal window size selection technique for feature computation is also described.

DETAILED DESCRIPTION OF THE PREFERRED EMBODIMENTS

The embodiments of our invention provide a method for tracking an object. In one embodiment the object is a tumor, and tracking is performed during radiotherapy. The method does not require fiducial markers and is non-invasive. The tumor tracking uses regression model fitting between 2D image features and tumor motion.

Figure 1:
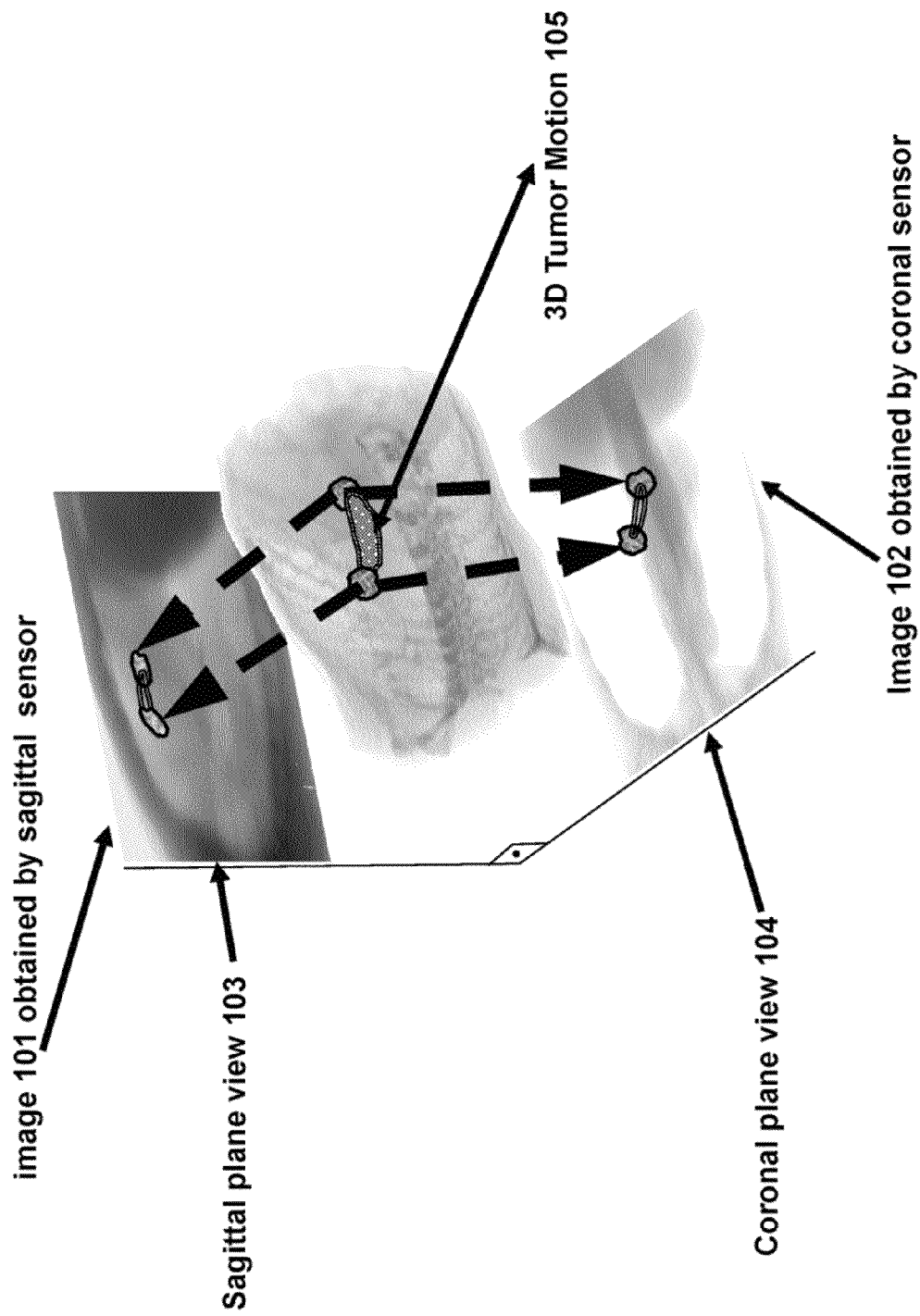
FIG. 1 is a schematic of projections and multiple imaging sensors to track 3D tumor motion according to embodiments of the invention.

FIG. 1 shows multiple images 101-102. For example, the images are obtained from a sagittal sensor and a coronal sensor. The sensors can use fluoroscopy or ultrasonography, for example. In other words, the tracking according to embodiments of our invention is non-invasive. Each sensor acquires a sequence of images (videos) 101-102. The sequences are synchronized so that al each imaging time (frame rate), the sensors acquire a set of images, there being one image in the set for each sensor. The sensor can be slanted or orthogonal to each other. However, this is not required. The only requirement is that the viewpoints for the sensors are different. For example, the images provide a sagittal plane view 103 and a coronal plane view 104 to determine the tumor motion 105 using the orthogonal imaging. Due to breathing, the projected tumor regions for the multiple views move significantly.

Our intuition is that image feature variations, which is sensitive to motion, can be linearly correlated with tumor motion. Thus, we train a linear regression function beginning with a first set of images using randomly generated motion hypotheses, while optimizing a size of window from which the features are extracted in each image. There is a window for each view, in addition. The regression function can be non-linear. Then, we apply the regression model to the features determined for each current set of images within windows to track the object to a next location.

Tracking Method

Figure 2:
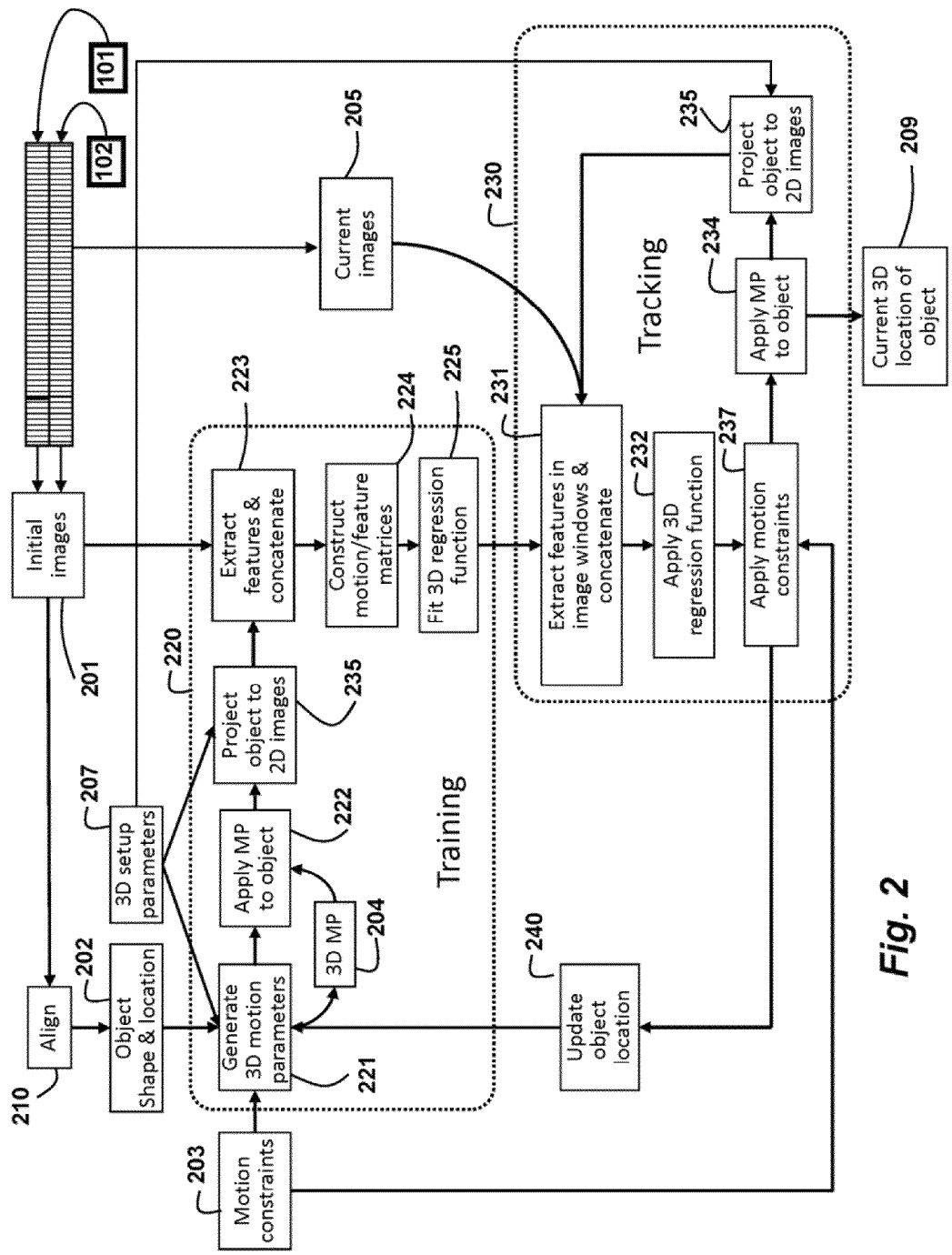
FIG. 2 is a flow diagram of a method for tracking tumor motion according to embodiments of the invention.

As shown in FIG. 2, the tracking uses a training module 220 to determine a regression function, and a tracking module 230 to determine the 3D location 209. The regression function is retrained as new images are acquired. The method can be performed in a processor connected to memory and input/output interfaces as known in the art.

The training begins with an initial set of images 201 retrieved from the image sequences 101 and 102. These images are aligned 210 to determine an initial object 3D location and shape 202. The initial object shape can be determined manually or automatically using an object recognition module, or other computer vision techniques.

In one embodiment, the alignment 210 is achieved by matching the initial set of sequences (for instance X-ray videos) with a set of reference images (such as digitally reconstructed radiograms from computer tomography (CT) data, where the object shape and location are known. The alignment process determines a subset of images in the initial set of sequences where the object shape and position are known, thus the tracking can start with these subset of images and find the object location in the rest of the images in the given sequences.

Using 3D setup parameters 207, the 3D location 202 of the object can be obtained with respect to an imaging plane coordinate system, as well as with respect to a real world coordinate system. The shape of the object is a 3D volume that defines the object. The location of the object can be assigned as the center-of-mass the object shape.

The training uses motion constraints 3D 203, 3D motion parameters (MP) 204, and 3D setup parameters 207 to determine the initial 3D location of the tumor for sets of training images, e.g., the first two hundred images.

Training

Using the initial location and shape of the object, motion constraints, and 3D motion, we generate 221 the 3D motion parameters. The 3D MP are applied 222 to the object, and the object is then projected 235 to the images using the 3D setup parameters. Next, we extract 223 image features in a window for each training set of images. The features are concatentated to construct 224 motion and feature matrices, which constitute a combined feature. A 3D regression function is fit 225 to the matrices to complete the training. The regression function is used by the tracking module 220.

Tracking

For each current set of images 205, we extract 231 features, using the tracking windows. For example, when two views are used, the current set includes a pair of images, such as sagittal and coronal plane views 103-104. We apply 232 the 3D regression function to the features to obtain motion parameters, and then apply 237 the motion constraints 203 to motion parameters. The location of the windows can be updated 240, and the regression function can be retrained starting at step 221.

After the motions constraints are applied, we apply 234 the motion parameters (MP) to the object, and project 235 the 3D motion to the image planes using the 3D setup parameters, which produces the current 3D location 309 of the tumor, and the location of the window for a next set of images to be processed.

3D Regression Tracking (3DR)

Our tracking method trains the regression function specified by a m×d matrix of regression coefficients $\Omega$, where d is a number of affine transformation parameters. The regression function correlates the image features in a matrix X (feature matrix) with object motion in matrix Y (motion matrix). This can be done by training the function in 3D Euclidean space (3DR). Alternatively, this can be done by training two regression functions in 2D planar space, and intersecting the two functions in 3D space (2DR).

We formulate the training as a minimization problem, which determines coefficients of the regression function by minimizing a geodesic distance between the features and the motion parameters $$\min_{\Omega} \|X\Omega - Y\|^2 + \lambda \|\Omega\|^2, \quad (1)$$

where the weight $\lambda$ if for a regularization, the weight: gives preference to solutions with smaller norms. Tikhonov regularization is also known s ridge regression.

For one image sequence, the object motion between two sequential images can be modeled as a 3×3 transformation matrix M. We use M to represent the transformation from a unit square in an object space to an affine window region enclosing the object in the image space, that is, $$(x_{img}, y_{img}, 1) = M(x_{obj}, y_{obj}, 1)$$

The object location $M_t$ 209 at time t can be determined from $M_{t-1}$ by $$M_t = M_{t-1} \cdot \Delta M_t, \quad (2)$$

where $\Delta M_t$ is the motion between sequential images at times t-1 and t.

Because affine motion matrices lie on a differentiable manifold, we apply a Lie group exponential map to determine $\Delta M_t$ $$\Delta M_t = \exp(h_t^T \Omega), \quad (3)$$

where $h_t \in R^m$ is a m×1 feature vector corresponding to the unit square in object space warped from $I_t$ through.

Figure 3:
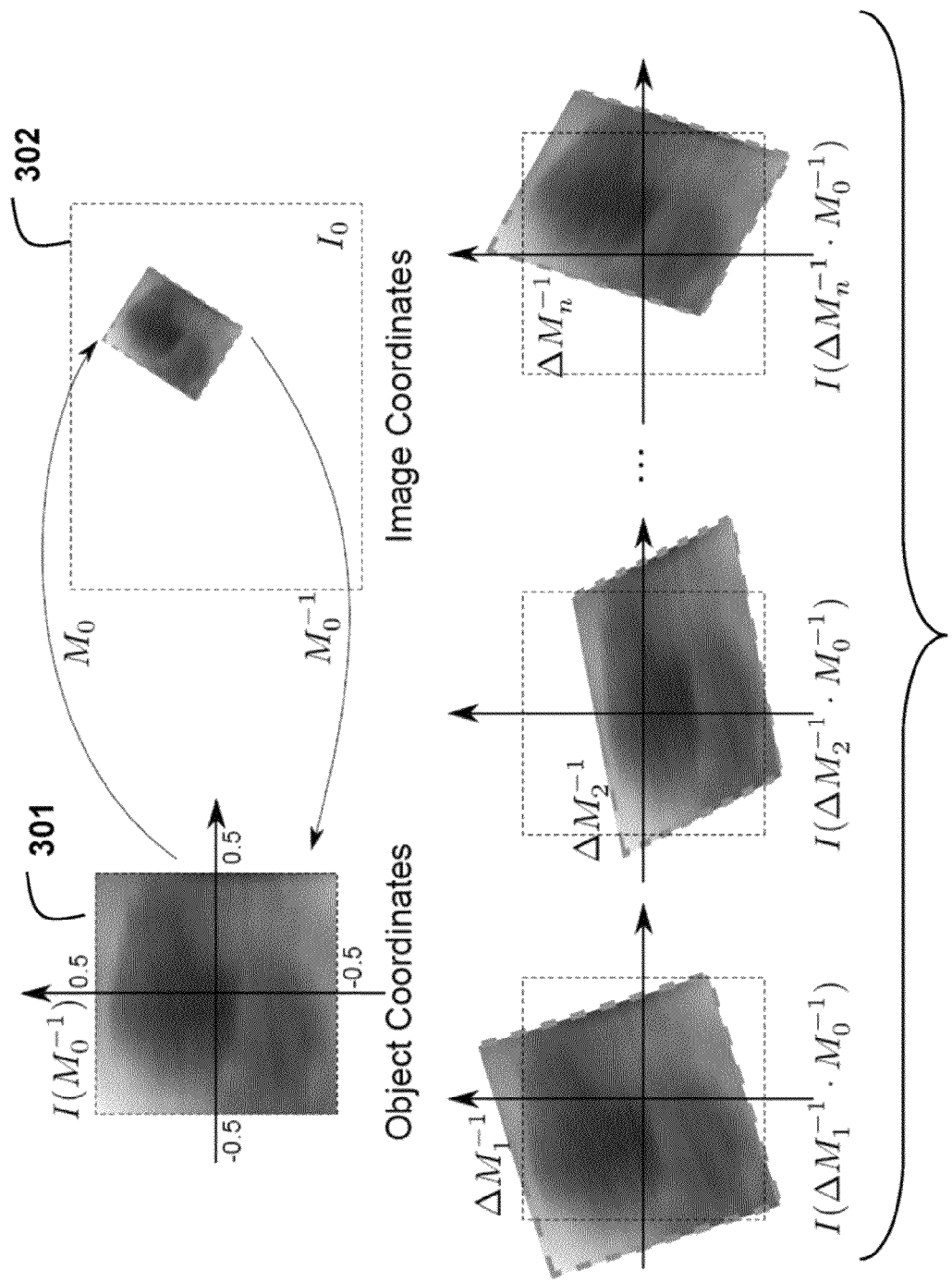
FIG. 3 is a schematic of transformations used by embodiments of the invention.

As shown in FIG. 3, we generate n training hypotheses $\Delta M_i^{-1}$ 310 in object coordinates 301, and determine corresponding features in image coordinates 302A. A training set of n random affine transformations $\Delta M_i$ together with their corresponding feature vectors $h_{o,i}$ are extracted from image $I_0$ to determine the optimal solution of Eq.(1). The affine transformation $M_0$ maps a unit square from the object to image coordinates.

The various transformation shown in FIG. 3 are described below. We construct 223 the matrices X and Y as $$X = (h_{0,1}^T; \ldots; h_{0,n}^T)_{n \times m}, Y = ((\log \Delta M_1)^T; \ldots; (\log \Delta M_n)^T)_{n \times d}.$$

To train the joint regression function that correlates the 3D tumor motion, e.g., translational, directly with the sequence of image sets, we concatenate the feature vectors extracted from a set of images, e.g., two orthogonal views, and directly estimate the 3D affine motion corresponding to the features.

We construct the combined feature vectors $(h_{0,i}^1; h_{0,i}^2)$ from the two images $I_0^1$ and $I_0^2$ at time t=0 by first randomly generating 221 n 3D affine matrices $\Delta M_i^*$, and then moving 222 the object according to $\Delta M_i^*$ in the 3D Euclidean space. Next, we project 235 $\Delta M_i^*$ onto the images using the 3D motion parameters. Within the corresponding window regions, we extract the features $h_{0,i}^1$ and $h_{0,i}^2$ for images in at set of two images.

In this case, $\Omega^*$ maps combined feature vectors $(h_{t,i}^1; h_{t,i}^2)$ (t=0, i=1, ..., n) to corresponding 3D affine motion $\Delta M_i^*$, where $\Delta M_i^*$ is a 4×4 affine matrix. Thus, $$X^* = ((h_{0,1}^1; h_{0,1}^2)^T; \ldots; (h_{0,n}^1; h_{0,n}^2)^T), \text{ and}$$

and $$Y^* = ((\log \Delta M_1^*)^T; \ldots; (\log \Delta M_n^*)^T).$$

The features $h_t$ we extract are, for example, Histograms of Oriented Gradients (HOG). We use 8-bin histogram for each 5×5 block within the tracking window and concatenate the features into a vector. We solve Eq. (1) by ridge regression. It should be noted that other features can be used, for example features that are sensitive to object motion.

Tumor Motion Prior Probability

The tumor notion trajectories do not change significantly during radiation therapy. For many gated treatment, the tumor location during the exhale phase is more stable and reproducible than during the inhale phrase. This indicates that the tumor motion can be modeled as a periodic asymmetric function, with more time during the exhale phrase. When there is no hysteresis in the respiratory system, the pathways for inspiration and expiration of one respiratory cycle are approximately the same. Even with the presence of hysteresis, the maximum deviation between the two pathways is usually much smaller than the distance along the primary direction of the tumor motion.

Therefore, we use the linear motion constraint 203 to regularize tracking results. The idea is to project 235 the motion estimations onto to image, which best approximates the tumor trajectory, and then use the projection to represent the tumor locations. The motion constraints improve the tracking accuracy, and stabilizes the tumor trajectories by removing high-frequency jitters. In practice, this can reduce the movement of the rotating gantry or the treatment table to deliver consistent treatments.

To enforce the motion constraint, we collect the tracking results for the first part of the sequences (e.g., two hundred sets of images) and then concatenate the results in a 200×3 matrix A. Then, we determine the principal line from an eigenvector $v_{max}$ that corresponds to a largest eigenvalue $\lambda_{max}$ of A. The line projection matrix can be determined as $v_{max} \cdot v_{max}{}'$. In other words, we vector multiply the principle line with its transpose to obtain a line projection matrix and assign the object motion prior probability as the prior projection matrix.

The motion prior probability can be learned on manifolds. In this case, nonlinear motion can also be captured in the motion prior probability. Such manifolds are learned using the object tracking results on the first part of the sequences. Among manifold learning methods, we apply locally linear embedding, isomaps, etc.

In one embodiment, the motion prior probability is given by a biomechanical motion model. The biomechanical model defines how each point in the CT data moves during respiration, see the related application for example. We learn such biomechanical models using four-dimensional CT data and hyper-realistic breathing simulators. We can also learn the biomechanical motion model from multiple persons to obtain a generic and more regularized motion prior probability. For this, the biomechanical models of different people are normalized to the body model (C T data) of the current patient.

Optimal Tracking Window

If the object is a tumor, then the size of the tracking windows has an important role for tracking the tumor in soft tissues, especially in lung and abdomen areas. This is because different parts of the tumor tend to deform differently, and the deformation depends on the relative locations to the tissue boundaries and external forces. To obtain valid tracking results for template based methods, the size of the tracking window should not under-estimate motion or lose track of the tumor.

We use self-similarity in the tumor region to determine the optimal size for the tracking window. A self-similar object is exactly or approximately similar to a part of itself, i.e., the whole has the same shape as one or more of the parts. Objects, such as tumors, are statistically self-similar.

For a candidate window size $w_x \times w_y$, the search window size is $2w_x \times 2w_y$ with the same center, and $r = (w_x \times x_y)(w_x^* \times w_y^*)^{-1} \in [0.5, 1.5]$, where $w_x^* \times w_y^*$ is a bounding size of the object.

We determine HOG distances for any pair of image patches within the window region using the L2 norm, and use the mean error as an indicator to describe the discriminatory power of the candidate window size. Intuitively, the larger the mean error, the more discriminatory power the window size has. However, different distance distributions can have the same mean error. To take into account these cases, we give preference to the small (20% of) HOG distances and use their mean as the indicator.

More specifically, we first generate a set of candidate windows at different sizes around the object location. We choose one of these candidate windows as the optimal tracking window. Within each candidate window, we generate multiple smaller patches. These patches can be 8×8 image pixel blocks, etc., that overlap with each other or arranged on a grid structure. We then define features for each patch. These features can be HOG features. We compute the distances between all possible pairs of the patches using their features. In case of different sizes of patches used within a candidate window or between candidate windows, we normalize the distances with respect to the corresponding patch size.

After we compute the distances, we construct a distribution function of the distances. Our intuition is that feature computations on and around an optimal window will be sensitive to window motion, thus the window will not be self-similar. In other words, the patch distances will not concentrated on the lower end of the distribution function. As a result, we consider the lower end of the distribution function, e.g. 20% of the lowest distances, and choose the candidate window that has higher mean (or median) values for this lower end as the optimal window. We compute the mean (or median) of the lower end and assign it as a discriminative-power score. The optimal window should have the largest discriminative-power score.

We can also use multiple windows in each image, and then apply multiple regression functions to the features to obtain multiple 3D motion parameters. The multiple 3D motion parameters are then combined into a single 3D motion parameter for further processing.

2D Regression Tracking (2DR)

Instead of training a single 3D regression function, we can train two regression matrices $\Omega_1$ and $\Omega_2$ for the two views, and apply Eq. (2) and Eq. (3) iteratively to track the tumor in each image in a set. After we have the two individual tracking results $p_t^1$ and $p_t^2$ of the two orthogonal images at time t, we can determine the tumor location $p_t$ in 3D through back-projection. We connect $p_t^1$ and $c_1$ to form line $l_t^1$, $p_t^2$, and $c_2$ to form line $l_t^2$, and then determine $p_t$ as the intersection of lines $l_t^1$ and $l_t^2$, while $c_1$ and $C_2$ are the view points of two sensors. In practice, $l_t^1$ and $l_t^2$ may not necessarily intersect with each other therefore we select the midpoint of a shortest path connecting these lines.

Effect of the Invention

Our tracking consistently achieves more accurate tracking results than prior art methods. We can attain a mean error of less than 2 pixels, and a standard deviation of the less than 1 pixel. One pixel can corresponds to about 0.2 mm in tracking accuracy. The tracking also matches the ground truth trajectory.

In contrast, prior ad optical flow (OF) based trackers tends to underestimate the tumor motion causing significant errors when the tumor motion is large. The OF takes about 28 minutes to process a single image, which is impractical for real-time tracking during radiotherapy. Our regression based method can track the tumor in less than a tenth of a second, which is sufficient for real-time tracking and frame rates of the imaging process.

Pl₁ particle filter based trackers exaggerates the tumor motions at the two extremities and produces jittery results. This is also true for a Pyramid of Histograms of Orientation Gradients (PHOG) particle filter. One issue with the particle filter based trackers is that a lack of texture in images sometimes causes the selection of wrong motion hypothesis as the mode of the approximated probability density function after the importance sampling.

When the conventional 2DR fails to track the tumor in one image, it cannot recover and causes a large error. In contrast, our 3DR avoids such divergences due to the joint and concurrent feature extraction from the multiple views, and maintaining the tumor location in 3D space, as opposed to two 2D planes as in the prior art.

The embodiments of the invention provide a tumor tracking method that does not require markers, or other invasive techniques. The method trains a regression function that relates 3D tumor motion hypotheses and concatenated appearance features of the tumor regions within the corresponding orthogonal images.

The tracker outperforms the state-of-the-art tracking methods both in accuracy (less than 2 pixels and a standard deviation of less than 1 pixel), and speed (0.03 sec) per image pair.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for tracking a three-dimensional (3D) object using multiple sequences of sets of images, wherein the images in each set are acquired concurrently of the object from different viewpoints, and comprising for each current set of images the steps of:
   extracting features from each image in each current set, wherein the features are extracted within a window in each image;
   applying a regression function, subject to motion constraints, to the features to obtain 3D motion parameters;
   applying the 3D motion parameters to the object to obtain a 3D location of the object; and
   projecting a shape of the 3D object at the 3D location onto each image to update a location of the window for each image in a next set of images, wherein the steps are performed in a processor.

2. The method of claim 1, wherein the viewpoints are slanted to each other.

3. The method of claim 1, wherein the regression function is linear.

4. The method of claim 1, wherein the regression function correlates the features to the 3D motion parameters.

5. The method of claim 1, wherein the features are histograms of oriented gradients.

6. The method of claim 1, wherein the features are sensitive to motion of the object.

7. The method of claim 1, further comprising:
   training the regression function using initial sets of images.

8. The method of claim 7, wherein the training minimizes a geodesic distance between the features and the 3D motion parameters.

9. The method of claim 7, further comprising:
   obtaining the locations for the initial sets of images;
   arranging the locations into a matrix;
   determining a principle line using an eigenvector corresponding to a largest value in the matrix;
   vector multiplying the principle line with a transpose of the principle line to obtain a prior projection matrix; and
   assigning an object motion prior probability as the prior projection matrix.

10. The method of claim 9, wherein the object motion prior probaility is determined on manifolds.

11. The method of claim 1, further comprising:
   projecting the shape of the 3D object onto each image according to 3D setup parameters to obtain a location of the window for each image,
   optimizing a size of the window based on self-similarity of the object.

12. The method of claim 11, further comprising:
   determining the self-similarity using a histogram of oriented gradients.

13. The method of claim 11, further comprising:
   generating patches within different candidate window sizes;
   computing distances between patches;
   assigning a discriminative power score according to a mean of lowest distances; and
   selecting the candidate window size that has a largest discriminative-power score as an optimal size of the window.

14. The method of claim 1, wherein the regression function is subject to motion constraints, and further comprising:
   applying a biomechanical motion model as motion constraints.

15. The method of claim 14, wherein the biomechanical motion model is learned from multiple persons.

16. The method of claim 1, further comprising:
   updating the regression function at the location using the current set of images.

17. The method of claim 1, wherein the features are extracted within multiple windows in each image and multiple regression functions are applied to the features to obtain multiple 3D motion parameters, and further comprising:
   combining the multiple 3D motion parameters into a single 3D motion parameter.

* * * * *